United States Patent
Inoue et al.

(10) Patent No.: US 7,094,349 B2
(45) Date of Patent: Aug. 22, 2006

(54) ORGANIC POROUS ARTICLE HAVING SELECTIVE ADSORPTION ABILITY FOR BORON, AND BORON REMOVING MODULE AND ULTRA-PURE WATER PRODUCTION APPARATUS USING THE SAME

(75) Inventors: Hiroshi Inoue, Tokyo (JP); Koji Yamanaka, Tokyo (JP)

(73) Assignee: Organo Corporation, Tokyo (JP)

( * ) Notice: Subject to any disclaimer, the term of this patent is extended or adjusted under 35 U.S.C. 154(b) by 87 days.

(21) Appl. No.: 10/508,008

(22) PCT Filed: Jul. 14, 2003

(86) PCT No.: PCT/JP03/08902

§ 371 (c)(1),
(2), (4) Date: Sep. 24, 2004

(87) PCT Pub. No.: WO2004/014548

PCT Pub. Date: Feb. 19, 2004

(65) Prior Publication Data

US 2005/0167357 A1 Aug. 4, 2005

(30) Foreign Application Priority Data

Aug. 8, 2002 (JP) .............................. 2002-230996

(51) Int. Cl.
*B01D 39/00* (2006.01)
(52) U.S. Cl. .......................... 210/500.27; 210/500.34; 210/500.35; 210/500.36; 210/500.41; 210/502.1
(58) Field of Classification Search .......... 210/500.27, 210/500.42, 500.34, 500.35, 500.36, 502.1; 428/315.5; 264/41
See application file for complete search history.

(56) References Cited

U.S. PATENT DOCUMENTS

| | | | | |
|---|---|---|---|---|
| 5,789,081 A | * | 8/1998 | Komatsu et al. | 428/398 |
| 6,635,683 B1 | * | 10/2003 | Taira et al. | 521/27 |
| 6,884,356 B1 | * | 4/2005 | Kosenka et al. | 210/662 |
| 2003/0125398 A1 | | 7/2003 | Inoue et al. | |

(Continued)

FOREIGN PATENT DOCUMENTS

EP          972567          1/2000

(Continued)

OTHER PUBLICATIONS

Nishida, Shiy'ya et al. "Selmitsu Hyomen Graft Jugo ni yoru Polystyrene-kei Monolith no Kokinoka", Polymer Preprints, vol. 52, No. 4, p. 919 2003.

*Primary Examiner*—Ana Fortuna
(74) *Attorney, Agent, or Firm*—Oblon, Spivak, McClelland, Maier & Neustadt, P.C.

(57) ABSTRACT

An organic porous material having selective adsorption ability for boron, characterized in that it has an open cell structure comprising macro pores jointed to one another and, formed within the wall of the macro pore, meso pores having a pore diameter of 0.02 to 200 μm, has a total pore volume of 1 to 50 ml/g, and contains a compound capable of forming a complex with boric acid introduced through a covalent bonding in an amount of 1 μmol/g-dry porous material or more. The organic porous material exhibits improved ability for adsorbing boron and also is excellent in stability, and a boron removing module and an ultra-pure water production apparatus using the porous material have extremely high utility.

4 Claims, 1 Drawing Sheet

U.S. PATENT DOCUMENTS

| | | |
|---|---|---|
| 2003/0150732 A1 | 8/2003 | Yamanaka et al. |
| 2003/0173282 A1 | 9/2003 | Yamanaka et al. |
| 2003/0189005 A1 | 10/2003 | Inoue et al. |
| 2003/0213695 A1 | 11/2003 | Yamanaka et al. |
| 2004/0087732 A1 | 5/2004 | Inoue et al. |
| 2004/0122117 A1 | 6/2004 | Yamanaka et al. |

FOREIGN PATENT DOCUMENTS

| | | |
|---|---|---|
| JP | 4-49563 | 8/1992 |
| JP | 2000-140631 | 5/2000 |
| JP | 2000-281331 | 10/2000 |
| JP | 2002-38038 | 2/2002 |

* cited by examiner

ORGANIC POROUS ARTICLE HAVING SELECTIVE ADSORPTION ABILITY FOR BORON, AND BORON REMOVING MODULE AND ULTRA-PURE WATER PRODUCTION APPARATUS USING THE SAME

TECHNICAL FIELD

The present invention relates to an organic porous material capable of selectively adsorbing boron and to a boron-removing module and an ultrapure water production apparatus using the same.

BACKGROUND ART

Boron is contained in industrial raw water such as underground water or river water only in an amount of about several tens μg/l. However, since boron is present in water in the form of boric acid, which is an extremely weak acid, boron can only be insufficiently removed by a reverse osmosis membrane or ion exchange resin forming an ultrapure water production apparatus. There is a concern that the apparatus may have a propensity of allowing boron to leak into ultrapure water.

A resin for selectively adsorbing boron prepared by introducing N-methyl-glucamine into a styrene-based resin is commercially available as an adsorbent for efficiently removing a slight amount of boron by utilizing a highly acidic complex formed by boric acid and a polyhydric alcohol. However, this resin for selectively adsorbing boron has only insufficient capability of removing a very slight amount (several ng/l) of boron and allows leakage of boron at the initial stage when the superficial velocity increases.

In order to solve the above shortcoming to the above-mentioned boron absorption resin, Japanese Patent Application Laid-open No. 2000-140631 discloses a resin for selectively adsorbing boron. The resin comprises an anion exchange resin dotted with a compound having at least two phenolic hydroxyl groups and anionic exchange sites. However, since chromotropic acid or the like is dotted on the anion exchange resin via an ionic bond, the resin is unstable to the fluctuation of treated water quality and the compound dotted on the resin is desorbed during use, resulting in a remarkable increase in the effluent TOC load and a reduced adsorption capacity.

Japanese Patent Publication No. 4-49563 discloses a porous ion exchange material comprising an organic porous material has a continuous pore structure comprising macropores and mesopores, the macropores being interconnected with each other forming mesopores in the interconnected parts into which ion exchange groups are introduced. The ion exchange material includes an anion exchange material and is assumed to have the capability of adsorbing and removing boron in principle. However, this adsorption capability is quite limited because boric acid is an extremely weak acid.

An object of the present invention is therefore to overcome the above-mentioned shortcomings of the prior art. Specifically, an object of the present invention is to provide an organic porous material capable of selectively adsorbing boron and having high and stable capability of adsorbing boron, and to provide a boron-removing module and an ultrapure water production apparatus using the organic porous material.

DISCLOSURE OF THE INVENTION

In view of the above situation of the prior art, the present inventors have conducted extensive studies and have found that an organic porous material having a high and stable boron adsorbing capability can be obtained by introducing a compound forming a complex with boric acid into an organic porous material having a specific structure via a covalent bond, in an amount of 1 μmol/g or more of the porous material on a dry basis. The inventors have further found that a boron-removing module using said organic porous material and an ultrapure water production apparatus in which the module is incorporated are extremely useful. These findings have led to the completion of the present invention.

Specifically, the first invention provides an organic porous material capable of selectively adsorbing boron having a continuous pore structure which comprises macropores and mesopores, the macropores being interconnected with each other forming mesopores with a pore diameter of 0.02–200 μm in the interconnected parts, having a total pore volume of 1–50 ml/g, and comprising a compound forming a complex with boric acid introduced thereinto via a covalent bond in an amount of 1 μmol/g or more of the organic porous material on a dry basis. The organic porous material has a specific continuous pore structure with a pore volume and specific surface area being remarkably increased while maintaining the strength. This structure is novel and quite different from the structure possessed by any conventional particle-aggregated porous material. Therefore, a feed liquid comes in contact with the organic porous material at extremely high efficiency, utilization efficiency of a functional group in the compound bonding to the organic porous material is high even when the raw liquid has a low boron concentration, and leakage of even a slight amount of boron hardly occurs. The organic porous material thus exhibits an excellent capability of selectively adsorbing boron in a stable manner.

The second invention provides a boron-removing module comprising the organic porous material capable of selectively adsorbing boron alone or in combination with another ion exchange material filled into a container. The boron-removing module of the present invention permits treating water at low pressures and at large flow rates and can be suitably used for removing even a slight amount of boron in a large amount of water that must be treated in a short period of time, in particular, pure water, ultrapure water, industrial waste water, underground water, river water, and drinking water. The third invention provides an ultrapure water production apparatus comprising this boron-removing module. When the boron-removing module is installed on the downstream side of the ultrapure water production apparatus of the present invention, highly purified water can be used as the feed water, whereby efficiency in selectively adsorbing boron can be improved, and ultrapure water from which boron has been removed to a large extent can be obtained in a stable manner.

BEST MODE FOR CARRYING OUT THE INVENTION

Figure 1:
FIG. 1 is a scanning electron micrograph showing the microstructure of the organic porous material of the present invention capable of selectively adsorbing boron.

The basic structure of the organic porous material of the present invention capable of selectively adsorbing boron is a continuous pore structure comprising macropores and mesopores, the macropores being interconnected with each other forming mesopores with a pore diameter of 0.02–200 µm, preferably 0.2–200 µm and particularly preferably 5–120 µm in the interconnected parts. Specifically, in the continuous pore structure, macropores with pore diameters of, usually, 0.4–1,000 µm overlap. The overlapping section has mesopores functioning as common openings, providing an open pore structure. In the open pore structure, pores formed from the macropores and mesopores become flow paths for a liquid. The overlapped macropores usually have 1–12 layers of macropores, with many having 3–10 layers of macropores. Mesopores with a pore diameter of less than 0.02 µm are undesirable because the mesopores with a small pore diameter unduly increase pressure loss during passage of a liquid. On the other hand, a pore diameter of mesopores exceeding 200 µm is undesirable because the liquid comes in contact with the organic porous material insufficiently, resulting in reduced capability of selectively adsorbing boron. The above-described continuous pore structure of the organic porous material ensures uniform formation of macropore groups and mesopore groups and, at the same time, remarkably increases the pore volume as compared with particle-aggregated porous ion exchange materials described in F. Svec, Science, 273, 205–211 (1996) and other publications.

The organic porous material capable of selectively adsorbing boron has a total pore volume of 1–50 ml/g. If the total pore volume is less than 1 ml/g, the amount of liquid passing through a unit area becomes small, resulting in a low treatment capacity. The total pore volume of more than 50 ml/g is undesirable because the organic porous material has unduly fragile strength. The total pore volume of a conventional porous synthetic adsorbent or ion exchange resin is in the range of 0.1–0.9 ml/g at most. In the present invention, by contrast, materials with a greater total pore volume as compared with the conventional product in the range of 1–50 ml/g, and preferably 3–50 ml/g, can be used.

It is preferable that water as a typical liquid permeates through the organic porous material capable of selectively adsorbing boron (thickness: 10 mm) at a permeation rate of 100–100,000 l/min·m$^2$·MPa. If the permeation rate and the total pore volume are in the above ranges, the organic porous material can exhibit excellent performance due to the large area in contact the liquid, smooth passage of the liquid, and sufficient mechanical strength. The basic matrix forming the continuous pore structure is an organic polymer material having a crosslinking structure. The organic polymer material preferably contains crosslinking structural units in an amount of 2–90 mol % of the total amount of all structural units forming the polymer material. If the amount of the crosslinking structural units is less than 2 mol %, mechanical strength is insufficient. If the amount is more than 90 mol %, it is difficult to introduce a compound that can form a complex with boric acid into the organic porous material, and the material becomes significantly fragile.

There are no specific limitations to the type of the polymer material for the basic matrix forming the continuous pore structure. Examples of the polymer material include styrenic polymers such as polystyrene, poly(α-methylstyrene), and poly(vinyl benzyl chloride); polyolefins such as polyethylene and polypropylene; halogenated polyolefins such as polyvinyl chloride and polytetrafluoroethylene; nitrile-containing polymers such as polyacrylonitrile; (meth)acrylic polymers such as poly(methyl methacrylate) and poly(ethyl acrylate); a styrene-divinylbenzene copolymer, and a vinyl benzyl chloride-divinylbenzene copolymer. The above polymers may be either homopolymers obtained by polymerizing one type of monomer or copolymers obtained by polymerizing two or more types of monomers. In addition, a blend of two or more polymers may be used. Among these organic polymers, a styrene-divinylbenzene copolymer and a vinyl benzyl chloride-divinylbenzene copolymer are preferable in view of ease of introduction of ion exchange groups and high mechanical strength. The continuous pore structure of the organic porous material of the present invention can be easily observed using a scanning electron microscope (SEM). Pore diameters of macropores and mesopores can also be observed by SEM.

The organic porous material of the present invention capable of selectively adsorbing boron is obtained by introducing a compound forming a complex with boric acid into the organic porous material via a covalent bond in an amount of 1 µmol/g or more, preferably 10 µmol/g or more, and particularly preferably 100 µmol/g or more of the porous material on a dry basis. If the amount of the compound introduced is less than 1 µmol/g of the porous material on a dry basis, the boron adsorbing capability decreases.

A compound having at least two alcoholic or phenolic hydroxyl groups can be given as the compound to be introduced into the organic porous material to form a complex with boric acid. When this compound contains both types of hydroxyl groups, the compound must contain at least one alcoholic hydroxyl group and at least one phenolic hydroxyl group. Specific examples of these compounds include N-methyl-D-glucamine, N-methyl-D-glucosamine, glucamine, glucosamine, galactosamine, gluconic acid, glucosaccharic acid, glucuronic acid, alginic acid, chitosan, norepinephrine, epinephrine, dopa, dopamine, protocatechuic acid, gallic acid, and tannic acid.

One example of the method for producing the organic porous material capable of selectively adsorbing boron will now be described. The method for producing the organic porous material comprises preparing a water-in-oil emulsion by mixing an oil-soluble monomer, a surfactant, water, and, as required, a polymerization initiator, polymerizing the water-in-oil emulsion to obtain a polymer, optionally introducing into the polymer a functional group, into which a compound forming a complex with boric acid can be introduced, and reacting the polymer with a compound that can form a complex with boric acid.

The oil-soluble monomer denotes a lipophilic monomer that has low solubility in water. Specific examples of such a monomer include styrene, α-methylstyrene, vinyl toluene, vinyl anisole, vinyl benzyl chloride, divinylbenzene, ethylene, propylene, isobutene, butadiene, isoprene, chloroprene, vinyl chloride, vinyl bromide, vinylidene chloride, tetrafluoroethylene, acrylonitrile, methacrylonitrile, vinyl acetate, methyl acrylate, ethyl acrylate, butyl acrylate, 2-ethylhexyl acrylate, trimethylolpropane triacrylate, butanediol diacrylate, methyl methacrylate, ethyl methacrylate, propyl methacrylate, butyl methacrylate, 2-ethylhexyl methacrylate, cyclohexyl methacrylate, benzyl methacrylate, glycidyl methacrylate, and ethylene glycol dimethacrylate. These monomers may be used either individually or in combination of two or more. However, in the present invention, to obtain a porous material having excellent mechanical strength, it is desirable to select a crosslinking monomer such as divinylbenzene or ethylene glycol dimethacrylate as at least one monomer component, and incorporate such a monomer in an amount of 1–90 mol %, and preferably 3–80 mol %, of the total amount of the oil-soluble monomers.

There are no specific limitations to the type of the surfactant inasmuch as a water-in-oil (w/o) emulsion can be formed when the oil-soluble monomer is mixed with water. Nonionic surfactants such as sorbitan monooleate, sorbitan monolaurate, sorbitan monopalmitate, sorbitan monostearate, sorbitan trioleate, polyoxyethylene nonyl phenyl ether, polyoxyethylene stearyl ether, and polyoxyethylene sorbitan monooleate; anionic surfactants such as potassium oleate, sodium dodecylbenzene sulfonate, and dioctyl sodium sulfosuccinate; cationic surfactants such as distearyl dimethyl ammonium chloride; and amphoretic surfactants such as lauryl dimethyl betaine can be used as the surfactant. These surfactants may be used either individually or in combination of two or more. The "water-in-oil emulsion" refers to an emulsion having a continuous oil phase in which water droplets are dispersed. Although the amount of the above surfactant to be added significantly varies according to the type of oil-soluble monomer and the size of the target emulsion particles (macropores), a specific amount can be selected in the range of about 2% to 70% of the total amount of the oil-soluble monomer and the surfactant.

A compound that generates radicals by heat or light is suitably used as the polymerization initiator. The polymerization initiator may be either water-soluble or oil-soluble. Examples of the initiator include azobisisobutyronitrile, azobiscyclohexanenitrile, azobiscyclohexanecarbonitrile, benzoyl peroxide, potassium persulfate, ammonium persulfate, hydrogen peroxide-iron chloride, sodium persulfate-acidic sodium sulfite, and tetramethylthiuram disulfide. In some reaction systems, polymerization proceeds only by heat or light even if the polymerization initiator is not added. In such a case, the polymerization initiator need not be added.

There are no specific limitations to the method for mixing the oil-soluble monomer not containing an ion exchange group, the surfactant, water, and the polymerization initiator to prepare an water-in-oil emulsion. A method of mixing these components all together, a method of preparing a homogeneous mixture of oil-soluble components, which include the oil-soluble monomer, surfactant, and oil-soluble polymerization initiator, and a homogeneous solution of aqueous components, which includes water and the water-soluble polymerization initiator, and mixing the mixture and solution, and other similar methods can be used. In addition, although not necessarily essential, alcohols such as methanol and stearyl alcohol, carboxylic acids such as stearic acid, or hydrocarbons such as octane and dodecane may be added to the reaction system to control the shape and size of pores of the porous material and form micropores.

As a mixing apparatus for forming the emulsion, a planet-type stirrer for mixing raw materials filled into a mixing vessel, which is held inclined and caused to move around a revolution axis while rotating, a conventional mixer, homogenizer, or high-pressure homogenizer, and the like can be used. An apparatus suitable for obtaining an emulsion with a target particle size and a target particle size distribution may be selected from these apparatuses. The mixing conditions such as rotation frequency and stirring time can be arbitrarily determined so that an emulsion with a target particle size and a particle size distribution can be obtained. The mixing ratio by weight of the above oil-soluble components and the water-soluble components can be arbitrarily determined in the range of 2:98–50:50, and preferably 5:95–30:70.

Various polymerization conditions can be selected for polymerizing the water-in-oil emulsion thus obtained according to the types of the monomer and the polymerization initiator. For example, when azobisisobutyronitrile, benzoyl peroxide, potassium persulfate, or the like is used as the polymerization initiator, the emulsion may be polymerized with heating at 30–100° C. for 1–48 hours in a sealed vessel in an inert atmosphere. When hydrogen peroxide-iron chloride, sodium persulfate-acidic sodium sulfite, or the like is used as the polymerization initiator, the emulsion may be polymerized at 0–30° C. for 1–48 hours in a sealed vessel in an inert gas atmosphere. After the polymerization, the reaction mixture is removed from the reaction vessel and, if necessary, extracted with a solvent such as isopropanol to remove the unreacted monomer and the surfactant, thereby yielding an organic porous material. Specifically, oil components in the water-in-oil emulsion polymerize to form a matrix and water droplets become a pore structure.

The method for introducing a compound forming a complex with boric acid into the organic porous material will now be described. The introduction method is not specifically limited. For example, the method may comprise polymerizing an oil-soluble monomer containing a functional group, into which the compound forming a complex with boric acid can be introduced, to prepare a porous material, and reacting the porous material with the compound. Alternatively, the method may comprise polymerizing an oil-soluble monomer not containing a functional group to prepare a porous polymer material, into which the compound is to be introduced, introducing into the porous polymer a functional group into which the compound can be introduced by polymer reaction or graft polymerization, and reacting the polymer with the compound.

The functional group introduced into the porous polymer material, into which the above compound is to be introduced, is not specifically limited, insofar as the functional group has high reactivity and selectivity. Preferable functional groups include a chloromethyl group, amino group, carboxyl group, and epoxy group. To introduce the compound into the porous polymer material, the compound must have a functional group. The functional group used is preferably an amino group when the functional group in the porous polymer material is a chloromethyl group; a chloromethyl group, carboxyl group, or epoxy group when the functional group in the porous polymer material is an amino group; an amino group or epoxy group when the functional group in the porous polymer material is a carboxyl group; or an amino group or carboxyl group when the functional group in the porous polymer material is an epoxy group. As a method for introducing the compound into the organic polymer porous material, a known method such as polymer reaction and graft polymerization can be used. For example, as the method for introducing a polyhydric alcohol into the organic porous polymer material, a method of reacting the porous material with an amino group-containing polyhydric alcohol such as N-methyl-glucamine or an amino group-containing polyphenol such as catecolamine, when the porous material is a chloromethylstyrene-divinylbenzene copolymer or the like; a method of reacting the porous material with chloromethyl ether to introduce a chloromethyl group and then reacting the material with an amino group-containing polyhydric alcohol such as N-methyl-glucamine or an amino group-containing polyphenol such as catecolamine, when the porous material is a styrene-divinylbenzene copolymer or the like; or a method of introducing a radical initiation group or chain transfer group into the porous material to carry out graft polymerization of glycidyl methacrylate and then reacting the polymer with an amino group-containing polyhydric alcohol such as N-methyl-glucamine or a carboxyl group-containing polyphenol such as gallic acid or tannic acid can be given. The reaction conditions may be appropriately set according to the types of the organic porous polymer material and the compound.

The boron-removing module of the present invention comprises the organic porous polymer material capable of selectively adsorbing boron alone or in combination with another ion exchange material filled into a container. When the organic porous polymer material capable of selectively adsorbing boron alone is filled into a container, there are no specific limitations to the method used in forming the boron-removing module, insofar as a feed liquid comes in contact with the organic porous material capable of selectively adsorbing boron. Examples include a method of causing water to pass through a simple cylindrical or prismatic packed column in an upward or downward flow, an external pressure (outward-in) method of causing water to pass through a cylindrical packed layer from the outside of the cylinder circumference to the cylinder in side, an internal pressure (inward-out) method of causing water to pass through a cylindrical packed layer from the cylinder inside to the outside of the cylinder circumference, a tubular method of causing water to pass through a layer of a large number of cylinders of organic porous material by the inward-out or outward-in method, a flat membrane method using a sheet-like packed layer, and a pleat method using a folded flat membrane. As the shape of the organic porous material to be filled, a block-like shape, sheet-like shape, columnar shape, cylindrical shape, or the like is selected according to the type of the module. Small globular or amorphous particulate blocks with a size of 0.1–10 mm as the organic porous material may be filled into a container to form a packed layer. As a method for forming these various shapes of organic porous materials capable of selectively adsorbing boron, a method of cutting a block-like organic porous material, a method of filling a mold of an objective shape with the above emulsion and polymerizing the emulsion into the mold, or the like can be given.

When the organic porous material capable of selectively adsorbing boron is filled into a container in combination with another ion exchange material, the ion exchange material is selected according to the object of use of the module without specific limitations. Examples of the ion exchange material include ion exchange resin particles and ion exchange fibers having cation exchange groups such as a carboxylic acid group, iminodiacetic acid group, sulfonic acid group, phosphoric acid group, aminophosphoric acid group, iminophosphoric acid group, and aromatic hydroxyl group; anion exchange groups such as a quaternary ammonium group, tertiary amino group, secondary amino group, primary amino group, polyethyleneimine, tertiary sulfonium group, and phosphonium group; ampholytic ion exchange groups such as betaine and sulfobetaine; and chelate-forming groups such as an iminodiacetic acid group, phosphoric acid group, phosphate group, aminophosphoric acid group, iminophosphoric acid group, aromatic hydroxyl group, aliphatic polyol, and polyethyleneimine, and porous materials obtained by joining the ion exchange particles or weaving the ion exchange fibers. Further, the organic porous material of the present invention capable of selectively adsorbing boron may be present in combination with a porous ion exchange material, which is an organic porous material having the same continuous pore structure as the organic porous material of the present invention capable of selectively adsorbing boron and into which the cation exchange group, anion exchange group, ampholytic ion exchange group, or chelate-forming group described above is introduced as an exchange group instead of the compound that can form a complex with boric acid.

As a method of filling the ion exchange material and the organic porous material of the present invention capable of selectively adsorbing boron of the present invention in combination in the boron-removing module, a method of stratifying the ion exchange material and the organic porous material capable of selectively adsorbing boron in the module, a method of filling the module with a mixture of the ion exchange material in the shape of particles, fibers, or small blocks and the organic porous material capable of selectively adsorbing boron, or the like can be given.

When both the porous organic material capable of selectively adsorbing boron and the ion exchange material are stratified in the boron-removing module of the present invention, it is desirable to appropriately determine the order in which a liquid to be passed through the module comes in contact with the cation or anion exchange material and the organic porous material capable of selectively adsorbing boron, so that the pH of the liquid to be passed through the organic porous material capable of selectively absorbing boron is approximately neutral. This is because an alcoholic or phenolic hydroxyl group is known to exhibit high performance in forming a complex with boric acid when the pH is approximately neutral and an ion-containing liquid treated by a cation exchange material is acidic or neutral and an ion-containing liquid treated by an anion exchange material is neutral or alkaline.

The boron-removing module may have a structure with the afore-mentioned conventional resin for selectively adsorbing boron prepared by introducing N-methyl-glucamine into commercially availble styrene-based resin beads filled on the upstream side and the organic porous material of the present invention capable of selectively adsorbing boron filled on the downstream side. As described above, although the conventional resin for selectively adsorbing boron has a shortcoming of leakage of a slight amount of boron which occurs at the initial stage of water passage, such a resin produces only small voids in the packed layer and has a large adsorption capacity per unit volume due to the spherical gel matrix, as compared with the organic porous material of the present invention capable of selectively removing boron. Therefore, the above structure can ensure that the organic porous material of the present invention filled on the downstream side adsorbs a slight amount of boron leaking from the layer of the conventional resin for selectively adsorbing boron filled on the upstream side and can increase the throughput capacity of the boron-removing module by effectively utilizing the adsorption capacity of the conventional resin for selectively adsorbing boron.

The boron-removing module may be either a non-regenerative module to be used by replacing the entire module or filler after treating a certain amount of liquid or a regenerative module to be repeatedly used after desorbing the adsorbed boron. In the case of the regenerative module, since boron adsorbed on the organic porous material of the present invention capable of selectively adsorbing boron can be desorbed by an acid or alkali, the module can be regenerated by causing an acid such as hydrochloric acid, sulfuric acid, or nitric acid or an alkali such as caustic soda to pass therethrough. In the boron adsorption module in which another ion exchange material is also present, the ion exchange material and the organic porous material can be simultaneously regenerated using an appropriate acid or alkali.

The boron adsorption module can be used in all applications for removing boron from a feed liquid without specific limitations. The module can be suitably used for removing a slight amount of boron in a large amount of water that must be treated in a short period of time, in particular, deionized water, ultrapure water, industrial waste water, underground water, river water, and drinking water, because the module can be applied to treating at a low pressure and at a large flow rate. A specific application of the module of the present invention is the use in a waste water treatment unit for an stack gas desulfurization system a fossil-fueled power plant, in which case the module may be installed in any location in the waste water treatment unit. Another specific application of the module is the use in a seawater desalination unit using a reverse osmosis membrane to remove boron from drinking water, in which case the module may be installed downstream of the reverse osmosis membrane.

Since the organic porous material of the present invention capable of selectively adsorbing boron has a continuous structure having mesopores with a pore diameter of 0.02–200 μm through which a feed liquid pass, the feed liquid can come in contact with the boron adsorbent at remarkably high efficiency, the length of the adsorption zone in which both the boron adsorbing part and the boron non-adsorbing part are present in the module can be significantly reduced, and leakage of a slight amount of adsorbed ions hardly occurs, as compared with a conventional resin beads with bead sizes of about 0.2–0.5 mm for selectively adsorbing boron prepared by introducing N-methyl-glucamine into a styrene-based resin. This feature of the organic porous material of this invention is particularly suitably adopted in an apparatus such as an ultrawater production apparatus with an object of removing an extremely slight amount of boron for a long period of time in a stable manner.

The ultrapure water production apparatus of the present invention may comprise at least a unit for deionization or desalination by ion exchange, reverse osmosis, distillation, or the like and the above-described boron adsorption module. A typical example of the pure water production apparatus comprises a pretreatment step of removing turbid substances from raw water using a coagulation, sand filter, or the like; a primary pure water production step of removing impurities in the pretreated water to obtain pure water using an activated carbon filter, reverse osmosis membrane unit, two-bed three-tower (2B3T) ion exchanger, vacuum deaerator, mixed bed ion exchanger, micronic filter, and the like; a secondary pure water production step of removing impurities such as a slight amount of residual particles, colloidal substances, organic substances, metals, and ions as much as possible using a primary pure water tank for briefly storing the pure water obtained in the primary pure water production step and an ultraviolet irradiator, mixed bed ion exchange polisher, membrane separation unit such as an ultrafiltration membrane or reverse osmosis membrane unit, or the like installed at the downstream of the primary tank; an ultrapure water supply pipe for supplying the ultrapure water obtained in the secondary pure water production step to the point of use; and the boron-removing module installed at least in any one location between the downstream side of the pretreatment step and the ultrapure water supply pipe. When the boron-removing module of the present invention is installed in at least any one location between the downstream side of the pretreatment step and the ultrapure water supply pipe, a comparatively large amount of turbidities can be removed from raw water by the pretreatment step of removing turbidites. Therefore, when the pretreated water is passed through the organic porous material of the present invention capable of selectively adsorbing boron, boron can be removed from the water without clogging of the pores for water passage in the porous material.

The boron-removing module in the ultrapure water production apparatus of the present invention is preferably installed on the downstream side of the reverse osmosis membrane unit or 2B3T ion exchanger in the primary pure water production step, or on the downstream side of the ultraviolet oxidation unit, ultrafiltration unit, or non-regenerative cartridge polisher filled with ion exchange materials in the secondary pure water production step, or in the middle of the ultrapure water supply pipe located between the second pure water production step to the point of use. Although some compounds that can form a complex with boric acid, at the boron adsorption sites in the organic porous material, may adsorb ions other than boric acid, efficiency of the organic porous material in selectively adsorbing boron can be improved by using highly purified water (as described obove) the feed water for the boron-removing module. The boron-removing module is particularly preferably installed on the downstream side of any unit in the secondary pure water production step or in the middle of the ultrapure water supply pipe located in between the secondary pure water production step and the point of use, because boron already reduced to a slight level can be further removed. The boron-removing module may also be pconstituted by filling the 2B3T ion exchange column in the primary pure water production step with a conventional ion exchange resin in combination with the organic porous material of the present invention capable of selectively adsorbing boron.

EXAMPLES

The present invention will be described in more detail by examples, which should not be construed as limiting the present invention.

Example 1

(Preparation of Organic Porous Material)

Chloromethylstyrene (19.24 g), divinylbenzene (1.01 g), sorbitan monooleate (2.25 g), and azobisisobutyronitrile (0.26 g) were mixed and homogeneously dissolved. The chloromethylstyrene/divinylbenzene/sorbitan monooleate/azobisisobutyronitrile mixture was added to deionized water (180 g). The mixture was stirred using a planet-type stirrer (vacuum agitation defoaming mixer, manufactured by EME Co., Ltd.) at a reduced pressure of 13.3 kPa, at a revolution rate (rotation around a revolution axis) of 1,800 rpm/min, and at a rotation of 600 rpm/min for 2.5 minutes to obtain a water-in-oil emulsion. After the emulsification, the reaction system was sufficiently displaced with nitrogen and the emulsion was allowed to stand at 70° C. for 24 hours to polymerize. After the polymerization, the reaction mixture was extracted with isopropanol for 18 hours using a Soxhlet extractor to remove the unreacted monomers, water, and sorbitan monooleate. The extract was dried overnight at 85° C. under reduced pressure.

The inner structure of the organic porous material containing 5 mol % of a crosslinking component of the chloromethylstyrene/divinylbenzene copolymer thus obtained was inspected by SEM. The results are shown in FIG. 1. As is clear from FIG. 1, the organic porous material had a continuous pore structure. The organic porous material had a peak value of the pore diameter of 8.6 μm determined from the pore size distribution curve measured by mercury porosimetry. The total pore volume of the organic porous material was 6.3 ml/g.

(Reaction of Compound Forming Complex with Boric Acid with Organic Porous Material)

Next, the organic porous material was cut into small pieces (a sample). Dioxane (800 ml) was added to the sample (6.0 g) and the mixture was heated at 60° C. for 30 minutes. Then, a solution of N-methyl-D-glucamine (37.1 g) dissolved in deionized water (300 ml) was added and the mixture was reacted at 60° C. for 24 hours. After the reaction, the reaction mixture was poured into a large amount of water and washed with water to obtain an organic porous material capable of selectively adsorbing boron. The ion exchange capacity of the porous material was 1,700 mg-equivalent/g of the porous material on a dry basis and 250 mg-equivalent/g of the porous material on a wet basis. The organic porous material in wet conditions was dried under reduced pressure at 60° C. for 72 hours to make the porous material absolutely dry. The amount of introduced N-methyl-D-glucamine was determined by elemental analysis. As a result, the amount of introduced N-methyl-D-glucamine was 1,700 mg-equivalent/g of the porous material on a dry basis, which was equivalent to the ion exchange capacity. The inner structure of the organic porous material capable of selectively adsorbing boron was also a continuous porous structure. The absolutely dry sample had a peak value of the pore diameter of 9.2 μm determined from the through curve. The boron adsorption capacity was calculated. The boron adsorption capacity of the organic porous material capable of selectively adsorbing boron was confirmed to be 110 μmol/ml, as shown in Table 2.

Examples 2–5

(Preparation of Organic Porous Material)

An organic porous material was produced in the same manner as in Example 1, except for changing the amounts of chloromethylstyrene, divinylbenzene, sorbitan monooleate, and azoisobutylonitrile as shown in Table 1.

(Reaction of Compound Forming Complex with Boric Acid with Organic Porous Material)

An organic porous material capable of selectively adsorbing boron was produced in the same manner as in Example 1, except that the organic porous material was reacted with N-methyl-D-glucamine in an amount shown in Table 2. The results are shown in Table 2. In these Examples, the amount of introduced N-methyl-D-glucamine determined by elemental analysis showed good agreement with the ion exchange capacity.

(Preparation of Column for Evaluating Adsorption of Boron and Water Passage Experiment Using Same)

The same water passage experiment using the column for evaluating adsorption of boron as prepared in the same manner as in Example 1 was carried out. The results of the determined boron adsorption capacity are shown in Table 2.

TABLE 1

|  | Chloromethylstyrene (g) | Divinylbenzene (g) | Sorbitan monooleate (g) | Azoisobutylonitrile (g) |
| --- | --- | --- | --- | --- |
| Example 1 | 19.24 | 1.01 | 2.25 | 0.26 |
| Example 2 | 18.23 | 2.02 | 2.25 | 0.26 |
| Example 3 | 16.20 | 4.05 | 2.25 | 0.26 |
| Example 4 | 30.47 | 1.60 | 1.69 | 0.41 |
| Example 5 | 43.35 | 2.28 | 2.40 | 0.58 |

TABLE 2

| Example | Organic porous material (g) | NMG (g) | Amount of introduced NMG (μmol/g) | Ion exchange capacity Porous material on a dry basis (μeq/g) | Porous material on a wet basis (μeq/g) | Amount of adsorbed boron (μmol/ml) |
| --- | --- | --- | --- | --- | --- | --- |
| 1 | 6.0 | 37.1 | 1,700 | 1,700 | 250 | 110 |
| 2 | 5.5 | 31.2 | 1,100 | 1,200 | 120 | 50 |
| 3 | 4.3 | 22.4 | 600 | 800 | 90 | 40 |
| 4 | 6.0 | 36.1 | 1,800 | 1,700 | 300 | 130 |
| 5 | 12.8 | 78.1 | 2,200 | 2,100 | 370 | 160 |

NMG: N-methyl-D-glucamine pore size distribution curve measured by mercury porosimetry. The total pore volume was 6.8 ml/g.

(Preparation of Column for Evaluating Adsorption of Boron and Water Passage Experiment Using Same)

The organic porous material capable of selectively adsorbing boron was cut into a cylinder with an inner diameter of 4 mm and a length of 100 mm and filled into a tube made from polytetrafluoroethylene to prepare a column for evaluating adsorption of boron. An aqueous solution with a boron concentration of 50 μg/l was passed through the column at a flow rate of 50 m/hr. The change in the boron concentration as a function of time at the outlet port of the column was determined by ICP-MS to obtain a breakthrough curve.

Example 6

(Preparation of Column for Evaluating Adsorption of Boron and Water Passage Experiment Using Same)

Figure 2:
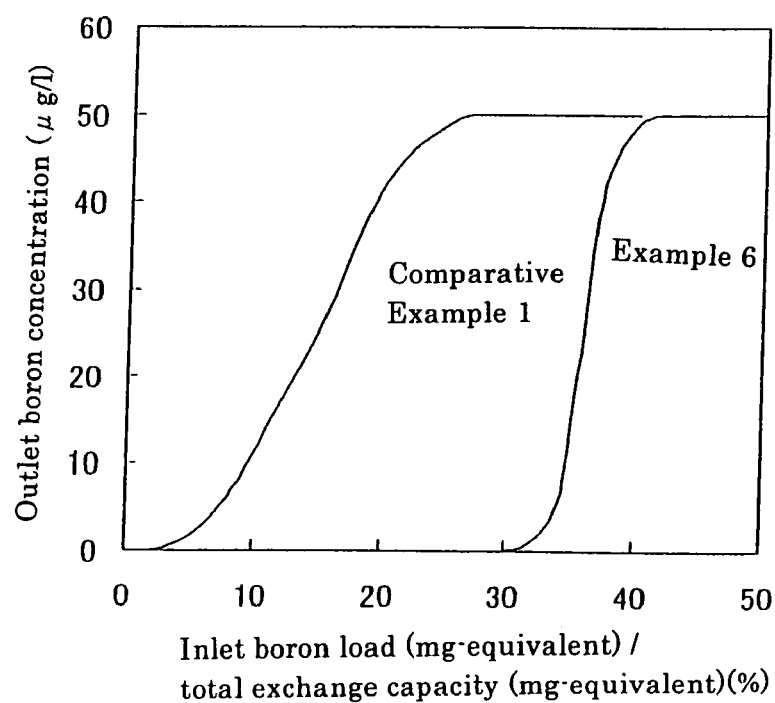
FIG. 2 is a boron breakthrough curve in a water passage experiment using a column for evaluating adsorption of boron.

A column for evaluating adsorption of boron was prepared by the method described in Example 1, except for using a column with a length of 300 mm. Except for using this column, the same water passage experiment for a boron aqueous solution as in Example 1 was carried out to obtain a boron breakthrough curve. The results are shown in FIG. 2. The proportion of the inlet boron load to the total ion exchange capacity in the column until the boron concentration in the outlet water exceeded 1 μg/l, that is, utilization efficiency of a functional group, was 31%. The same proportion until the boron concentration in the outlet water became equal to the boron concentration in the inlet water was 42%.

Comparative Example 1

The same water passage experiment as in Example 6 was carried out, except that a resin for selectively adsorbing boron (Amberlite IRA743, manufactured by Rohm and Haas Company) as a boron adsorbent was filled into a column with a length of 300 mm to provide a column for evaluating adsorption of boron to obtain a boron breakthrough curve. The results are shown in FIG. 2. The proportion of the inlet boron load to the total ion exchange capacity in the column until the boron concentration in the outlet water exceeded 1 µg/l, that is, utilization efficiency of a functional group, was 3%. The same proportion until the boron concentration in the outlet water became equal to the boron concentration in the inlet water was 28%.

As can be seen from Example 6 and Comparative Example 1, the organic porous material of the present invention capable of selectively adsorbing boron exhibits high utilization efficiency of a functional group and maintains high outlet water quality in a stable manner when water with a low boron concentration is treated.

INDUSTRIAL APPLICABILITY

The organic porous material of the present invention capable of selectively adsorbing boron exhibits a high and stable capability of adsorbing boron. A feed liquid comes in contact with the organic porous material at extremely high efficiency, utilization efficiency of a functional group of a compound bonding to the organic porous material is high even when the feed liquid has a low boron concentration, and leakage of a slight amount of boron hardly occurs. The organic porous material thus exhibits an excellent capability of selectively adsorbing boron in a stable manner. Therefore, a boron adsorption module and a boron-removing system using the organic porous material are extremely useful.

The invention claimed is:

1. An organic porous material capable of selectively adsorbing boron having a continuous pore structure which comprises macropores and mesopores, the macropores being interconnected with each other forming mesopores with a pore diameter of 0.02–200 µm in the interconnected parts, having a total pores volume of 1–50 ml/g, and comprising a compound forming a complex with boric acid introduced thereinto via covalent bond in an amount of 1 µmol/g or more of the porous material on a dry basis; wherein the organic porous material is selected from the group consisting of styrenic polymers, polyolefins, halogenated polyolefins, nitrile-containing polymers, (meth) acrylic polymers, a styrene-divinylbenzene copolymer, and a vinyl benzyl chloride-divinylbenzene copolymer.

2. The organic porous material according to claim 1, wherein the compound forming a complex with boric acid contains at least two alcoholic or phenolic hydroxyl groups.

3. A boron-removing module comprising the organic porous material according to claim 1 alone or in combination with another ion exchange material filled into a container.

4. An ultrapure water production apparatus comprising the module according to claim 3.

* * * * *